(12) United States Patent
Lee et al.

(10) Patent No.: US 8,167,004 B2
(45) Date of Patent: May 1, 2012

(54) AUTOMATIC LIQUID DISPENSERS

(75) Inventors: Young Hyun Lee, Seoul (KR); Ju Hwan Yun, Seoul (KR); Dong Joo You, Seoul (KR); Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1230 days.

(21) Appl. No.: 11/874,779

(22) Filed: Oct. 18, 2007

(65) Prior Publication Data

US 2008/0190514 A1  Aug. 14, 2008

(30) Foreign Application Priority Data

Feb. 14, 2007 (KR) .................. 10-2007-0015508
Mar. 5, 2007 (KR) .................. 10-2007-0021474

(51) Int. Cl.
*B65B 1/30* (2006.01)

(52) U.S. Cl. ............. 141/198; 141/95; 141/96; 141/192

(58) Field of Classification Search ............ 141/94, 141/95, 96, 192, 198; 73/290 V; 700/240
See application file for complete search history.

(56) References Cited

U.S. PATENT DOCUMENTS

| | | | | |
|---|---|---|---|---|
| 4,437,497 A | * | 3/1984 | Enander | 141/1 |
| 4,559,979 A | * | 12/1985 | Koblasz et al. | 141/9 |
| 4,572,253 A | | 2/1986 | Farmer et al. | |
| 4,733,381 A | * | 3/1988 | Farmer et al. | 367/93 |
| 5,027,284 A | * | 6/1991 | Senghaas et al. | 700/240 |
| 5,036,892 A | * | 8/1991 | Stembridge et al. | 141/1 |
| 5,944,068 A | * | 8/1999 | Hool | 141/65 |
| 6,394,153 B2 | * | 5/2002 | Skell et al. | 141/351 |
| 6,684,920 B2 | * | 2/2004 | Seitz et al. | 141/198 |
| 6,705,356 B2 | * | 3/2004 | Barton et al. | 141/2 |
| 6,789,585 B1 | | 9/2004 | Janke | |
| 7,114,517 B2 | * | 10/2006 | Sund et al. | 137/487.5 |
| 7,673,661 B2 | * | 3/2010 | Chase et al. | 141/360 |
| 2007/0107801 A1 | * | 5/2007 | Cochran et al. | 141/153 |

FOREIGN PATENT DOCUMENTS

CN  101576228 A  11/2009

* cited by examiner

*Primary Examiner* — Timothy L Maust (74) *Attorney, Agent, or Firm* — Birch, Stewart, Kolasch & Birch, LLP (57) ABSTRACT

An automatic liquid dispenser is disclosed wherein a liquid adjustor is disposed to prevent liquid from splashing outside of a receptacle, thereby saving the automatic liquid dispenser from being polluted with splashed liquid. A receptacle and level detector emits ultrasound to the receptacle and detects the ultrasound reflected from the receptacle to generate a signal. A controller receives the signal from the receptacle and level detector to control the liquid adjusting unit, and an identifying mark at the receptacle accommodator facilitates the correct arranging of the receptacle.

12 Claims, 8 Drawing Sheets

AUTOMATIC LIQUID DISPENSERS

CROSS-REFERENCE TO RELATED APPLICATION

The present application is based on, and claims priorities from, Korean Application Numbers 10-2007-0015508 filed Feb. 14, 2007 and 10-2007-0021471 filed Mar. 5, 2007, disclosures of which are incorporated by reference herein in their entirety.

BACKGROUND

The disclosed technique relates to automatic liquid dispensers. In general, liquid dispensers are installed on refrigerators and water purifiers to allow a user to readily extract liquid stored therein. Particularly, liquid dispensers mounted on refrigerators are so designed as to allow a user to extract liquid therethrough from outside without recourse to opening of a door of the refrigerators.

Figure 1:
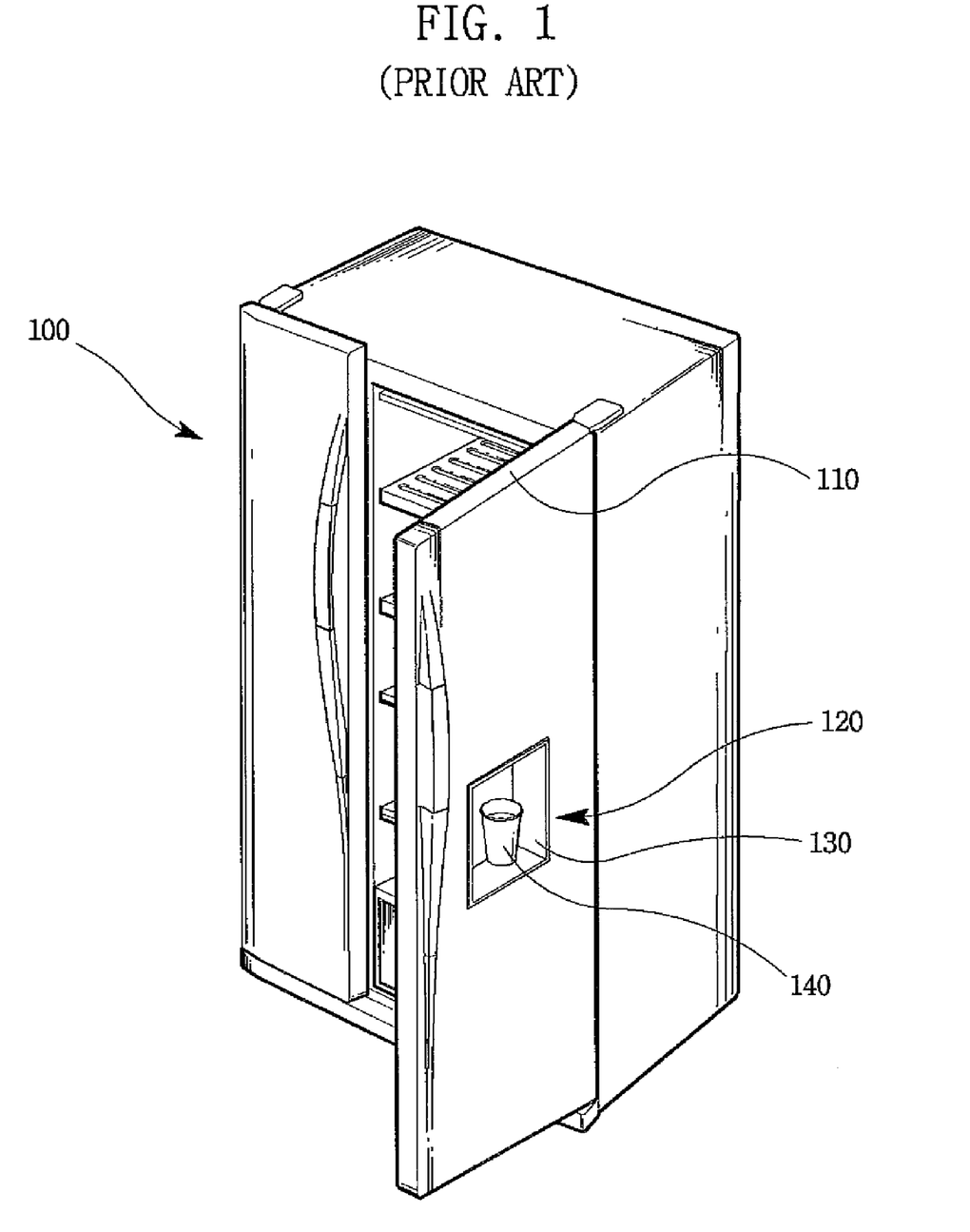
FIG. 1 is a perspective view illustrating a state where a liquid dispenser is disposed in a refrigerator according to prior art.

FIG. 1 is a perspective view illustrating a state where a liquid dispenser is mounted on a refrigerator according to prior art. A door 110 of a refrigerator 100 is frontally mounted with a liquid dispenser 120.

The liquid dispenser 120 is disposed with a receptacle accommodator 130, and a liquid ejecting key (not shown) for ejecting the liquid is installed inside the liquid dispenser 120. When a user inserts a receptacle 140 into the receptacle accommodator 130 of the liquid dispenser 120 mounted on the front surface of a door 110 of the refrigerator 100, and presses the liquid ejecting key, the liquid may be ejected into the receptacle 140 only during a time when the liquid ejecting key is depressed.

If a liquid dispenser is mounted on a refrigerator, there is no need of opening a door of the refrigerator, such that coolness inside the refrigerator may not be leaked outside to thereby reduce power consumption of the refrigerator, and to further lengthen or maintain the freshness of foods stored inside the refrigerator.

Of late, development of automatically dispensed liquid dispensers has been attempted, largely with a view to providing a user convenience.

SUMMARY

A first object is to provide an automatic liquid dispenser disposed with a liquid adjuster to prevent liquid from splashing outside, thereby preventing the automatic liquid dispenser from being dirtied with the splashed liquid.

A second object is to provide an automatic liquid dispenser capable of emitting ultrasonic to an upper surface of a receptacle and receiving the ultrasonic reflected from the upper surface of the receptacle to detect a receptacle height, whereby the receptacle height may be freely detected regardless of shape, material, surface state of the receptacle.

A third object is to provide an automatic liquid dispenser capable of using ultrasonic to reduce a manufacturing cost thereof compared with that of using light.

A fourth object is to provide an automatic liquid dispenser adapted to mount a receptacle arranger capable of precisely arranging a receptacle under a nozzle on a receptacle accommodator, whereby liquid ejected from the nozzle may be inputted only into the receptacle placed on the receptacle accommodator to thereby prevent liquid from being splashed.

In one general aspect, an automatic liquid dispenser includes a receptacle height measurer generating ultrasonic onto an upper surface of a receptacle and receiving the ultrasonic reflected from the upper surface of the receptacle to measure a receptacle height, a liquid dispensing unit ejecting liquid into the receptacle, a liquid level detector measuring a level of the liquid inside the receptacle, and a liquid adjuster adjusting the liquid ejected from the liquid dispensing unit.

In another general aspect, an automatic liquid dispenser includes a receptacle accommodator in which a receptacle is accommodated; a liquid supplier disposed on an upper surface of the receptacle accommodator, and disposed with at least one or more nozzles and connected to a liquid tank filled with liquid via a liquid path; a liquid adjusting unit adjusting one of the speed of liquid, quantity of liquid or the speed of liquid and the quantity of liquid supplied to the liquid supplier from the liquid tank altogether; a receptacle and level detector emitting ultrasonic to the receptacle and detecting the ultrasonic reflected from the receptacle to generate a signal; and a controller receiving the signal from the receptacle and level detector to control the liquid adjusting unit.

DETAILED DESCRIPTION

The features and nature of this description will become more apparent from the detailed description set forth below when taken in conjunction with the drawings.

Figure 2:
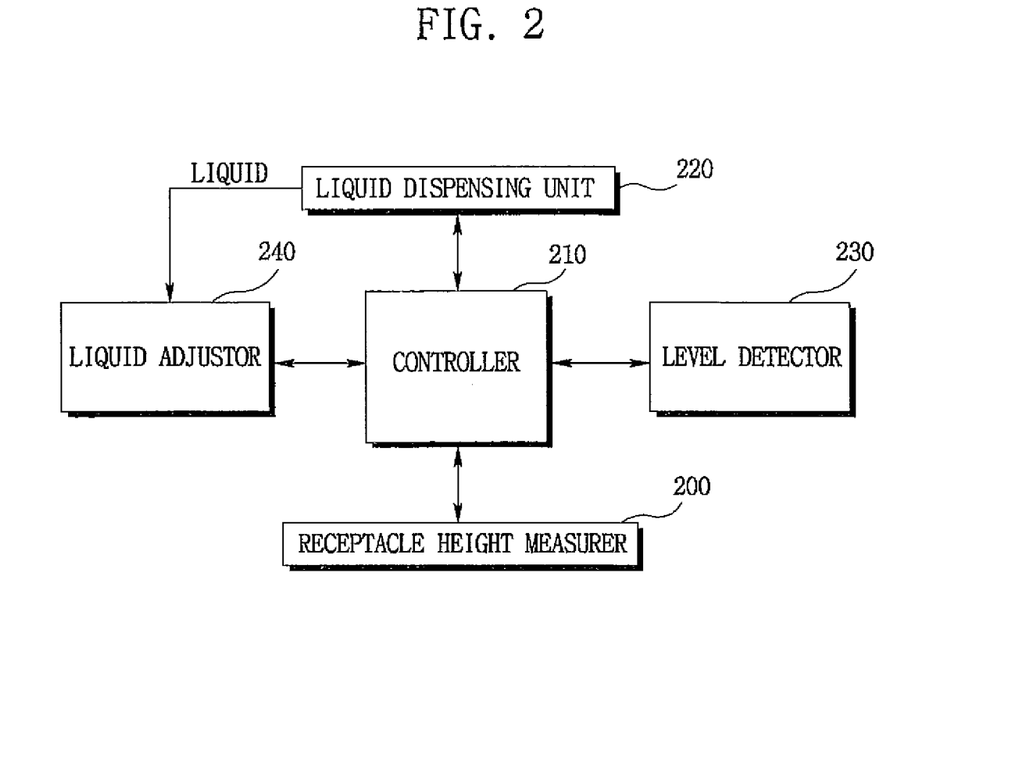
FIG. 2 is a schematic block diagram illustrating an automatic liquid dispenser according to a first exemplary implementation.

FIG. 2 is a schematic block diagram illustrating an automatic liquid dispenser according to a first exemplary implementation, wherein the automatic liquid dispenser includes a receptacle height measurer 200 generating ultrasonic onto an upper surface of a receptacle and receiving the ultrasonic reflected from the upper surface of the receptacle to measure a receptacle height, a liquid dispensing unit 220 ejecting liquid into the receptacle, a liquid level detector 230 measuring a level of the liquid inside the receptacle, a liquid adjuster 240 adjusting the liquid ejected from the liquid dispensing unit 220, a controller 210 controlling the receptacle height measurer 200, the liquid dispensing unit 220, the liquid level detector 230 and the liquid adjuster 240.

When a user accommodates a receptacle into the automatic liquid dispenser thus constructed, the receptacle height measurer 200 emits ultrasonic to an upper surface of the receptacle and receives the ultrasonic reflected from the upper surface of the receptacle to generate a signal.

The controller receives the signal generated by the receptacle height measurer 200 and outputs a control signal to the liquid dispensing unit 220 and the level detector 230.

When the signal is received from the controller 210, the liquid dispensing unit 220 ejects the liquid, and at the same time, the level detector 230 detects the level of the liquid ejected into the receptacle in real time. If the level of the liquid detected by the level detector 230 reaches a level higher then a predetermined liquid level relative to the receptacle height, the controller 210 outputs a control signal to preferably end the liquid ejection from the liquid dispensing unit 220.

Figure 3:
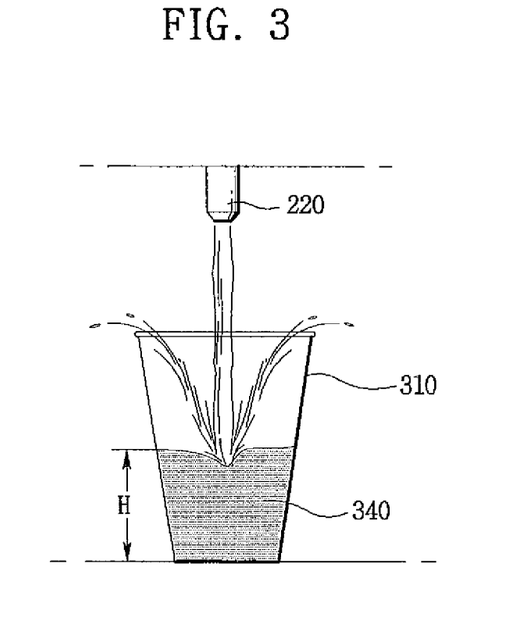
FIG. 3 is a schematic drawing illustrating a concept how to prevent the liquid from being splashed.

Referring to FIG. 3, if the liquid 340 ejected from the liquid dispensing unit 220 to the receptacle 310 reaches a predetermined height (H), the liquid 340 is splashed to leak out side of the receptacle 310 by the speed of the liquid 340 ejected from the liquid dispensing unit 220. As a result, the automatic liquid dispenser is polluted with the splashed liquid.

To solve the problem, the automatic liquid dispenser is disposed with the liquid adjuster 240 that enables to prevent the liquid splash, thereby protecting it from being polluted with the splashed liquid.

Therefore, there is an advantage in that ultrasonic is emitted to an upper surface of a receptacle and the ultrasonic reflected from the upper surface of the receptacle is received to detect a receptacle height, whereby the receptacle height may be freely detected regardless of shape, material, surface state of the receptacle, and a receptacle position as well.

Another advantage is that an automatic liquid dispenser is capable of using ultrasonic to reduce a manufacturing cost compared with that of using light.

Still another advantage is that a liquid adjuster is disposed to prevent liquid from splashing outside, thereby preventing the automatic liquid dispenser from being dirtied with the splashed liquid.

Meanwhile, the liquid adjuster may be designed to eject the liquid as much as a predetermined quantity, at a predetermined period of time and at a predetermined pressure.

The liquid adjuster is to preferably adjust the speed of liquid to be ejected to the receptacle. At this time, the ejecting speed of liquid of the liquid adjuster is preferably slower at a point where the liquid level is higher, and faster at a point where the liquid level is lower. Preferably, the speed decreases gradually, and step by step.

Figure 4:
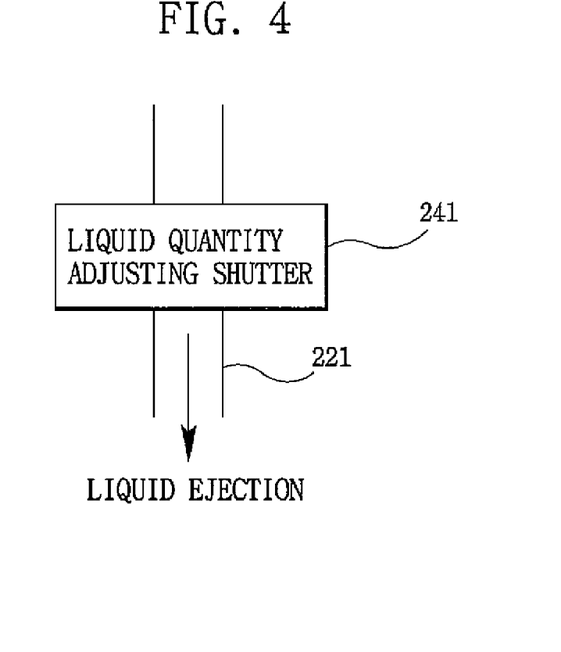
FIG. 4 is a schematic drawing illustrating a liquid adjusting unit according to a first exemplary implementation.

FIG. 4 is a schematic drawing illustrating a liquid adjusting unit according to a first exemplary implementation, where the liquid dispensing unit is mounted with a pipe 221 for ejecting the liquid into the receptacle, while the liquid adjuster is a liquid quantity adjusting shutter 241 mounted at the pipe 221 to block a cross-section of the pipe 221 and adjust the liquid quantity passing therethrough.

At this time, the liquid quantity adjusting shutter 241 blocks part or an entire cross-section of the pipe 221 through which the liquid passes to adjust the liquid quantity of the pipe 221.

Preferably, the liquid quantity adjusting shutter 241 gradually decreases the quantity of the liquid ejected in response to the level of the liquid inside the receptacle from the start of the liquid ejected from the liquid dispensing unit 220 to the end of the liquid ejection. When the quantity of the liquid ejected in response to the level of the liquid inside the receptacle is gradually decreased by the liquid quantity adjusting shutter 241, the liquid is prevented from being splashed outside the receptacle.

Meanwhile, the liquid quantity adjusting shutter 241 may block part or an entire cross-section of the pipe through which the liquid passes in the same fashion as that of camera shutter, where the shutting method may be freely designed.

FIGS. 5a to 5d schematically illustrate a state where a pipe of a liquid dispensing unit is blocked by a liquid quantity adjusting shutter.

Figure 5A:
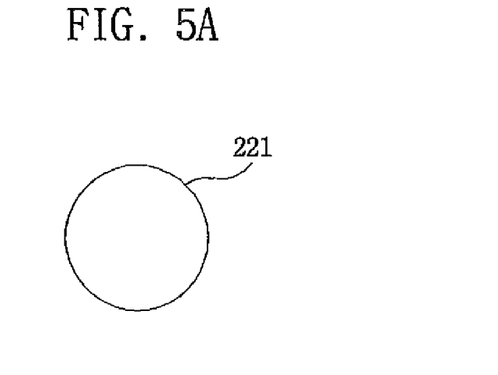
FIGS. 5a to 5d schematically illustrate a state where a pipe of a liquid dispensing unit is blocked by a liquid quantity adjusting shutter.
Figure 5B:
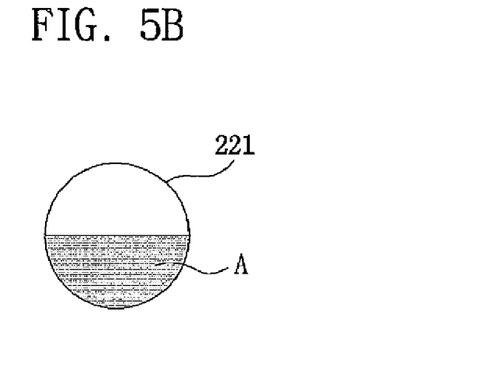
Figure 5C:
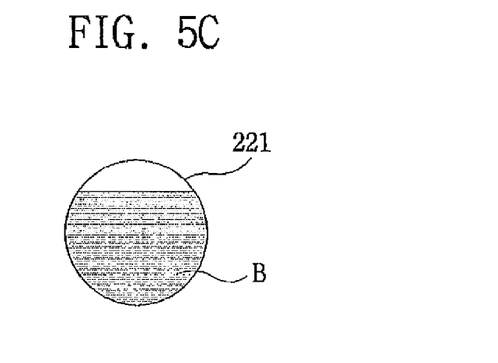
Figure 5D:
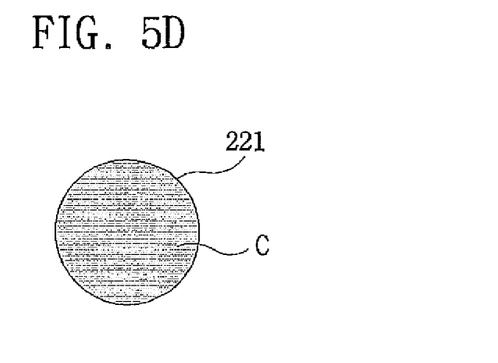

Referring to FIG. 5a, the liquid quantity adjusting shutter does not shutter the pipe 221 when the liquid is first ejected. But when the liquid reaches a first height, a part 'A' of the cross-section 'A' of the pipe 221 is blocked as shown in FIG. 5b. Successively, when the liquid fills the receptacle at a second height which is higher than the first height, another part 'B' of cross-section at the pipe 221 is blocked as depicted in FIG. 5c. For instance, FIG. 5b shows 50% of the cross-section at the pipe 221 being blocked, and FIG. 5b depicts 90% of the cross-section at the pipe 221 being blocked. In other words, the liquid quantity adjusting shutter blocks the cross-section of the pipe to adjust the liquid quantity. At this time, the entire cross-section 'C' of the pipe 221 is blocked to end the ejection of the liquid.

Figure 6:
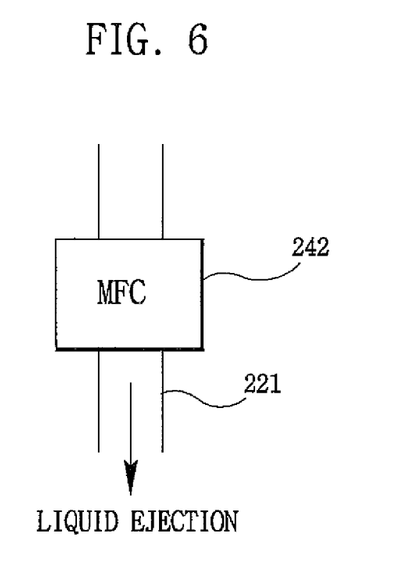
FIG. 6 is a schematic drawing illustrating a liquid adjusting unit according to a second exemplary implementation.

FIG. 6 is a schematic drawing illustrating a liquid adjusting unit according to a second exemplary implementation, where the liquid adjusting unit according to the second exemplary implementation is an MFC (Mass Flow Controller.242) disposed at the pipe 221 of the liquid dispensing unit for adjusting the pressure of liquid ejected into the receptacle.

In other words, it is preferred that the MFC 242 gradually decrease the pressure of the liquid ejected into the receptacle in response to level of liquid ejected into the receptacle, thereby preventing the liquid from splashing outside of the receptacle.

Figure 7:
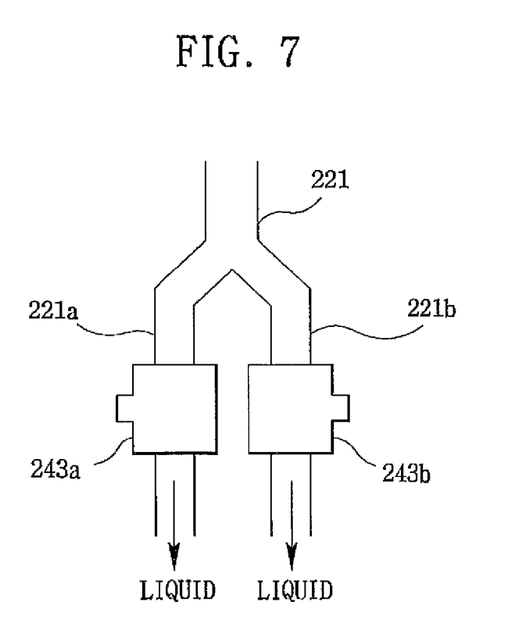
FIG. 7 is a schematic drawing illustrating a liquid adjusting unit according to a third exemplary implementation.

FIG. 7 is a schematic drawing illustrating a liquid adjusting unit according to a third exemplary implementation.

Referring to FIG. 7, the liquid dispensing unit is mounted with a pipe for ejecting the liquid into the receptacle, where the pipe 221 must be branched into a first pipe and a second pipe 221a, 221b.

The first pipe 221a is disposed with a first solenoid valve 243a, and the second pipe 221b is mounted with a second solenoid valve 243b, where the first and the second solenoid valves 243a, 243b function as liquid adjusting units for the third exemplary implementation.

When the liquid is ejected from the liquid dispensing unit, the first and second solenoid valves 243a, 243b are all opened to allow the liquid to be ejected therethrough, and when the level of the liquid reaches 50% or more of the height of the receptacle, one solenoid valve is closed and the other solenoid valve is opened to prevent the splash of the liquid.

Meanwhile, the liquid dispensing unit may be disposed with a plurality of pipes for ejecting the liquid, and each pipe may be mounted with a solenoid valve to thereby embody the third exemplary implementation.

Figure 8:
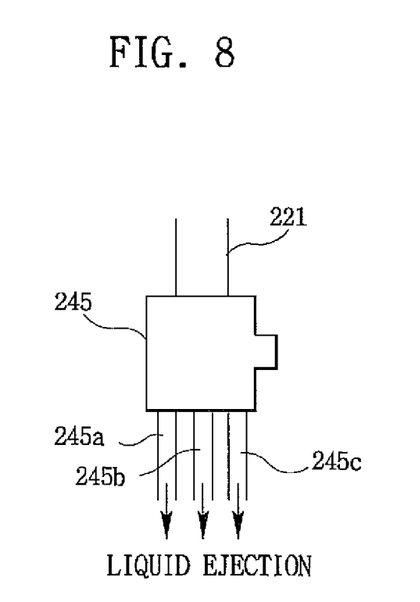
FIG. 8 is a schematic drawing illustrating a liquid adjusting unit according to a fourth exemplary implementation.

FIG. 8 is a schematic drawing illustrating a liquid adjusting unit according to a fourth exemplary implementation.

Referring to FIG. 8, a liquid dispensing unit is equipped with a pipe 221 for ejecting liquid into a receptacle, and a liquid adjusting unit is mounted with an inlet and a plurality of outlets 245*a*, 245*b*, 245*c*. The pipe 221 is connected to a distal end thereof with an inlet and an n-way solenoid 245 that gradually blocks the plurality of outlets 245*a*, 245*b*, 245*c* to cope with the level of the liquid inside the receptacle.

All the plurality of outlets 245*a*, 245*b*, 245*c* of the n-way solenoid 245 is opened when the liquid is ejected, but when the level of the liquid rises higher, the plurality of outlets are gradually blocked to prevent the liquid from being splashed outside of the receptacle. An n-way solenoid valve mounted with one inlet and two outlets is called a two-way solenoid valve, which is a known art, the detailed structure of which is not elaborated herein.

Figure 9:
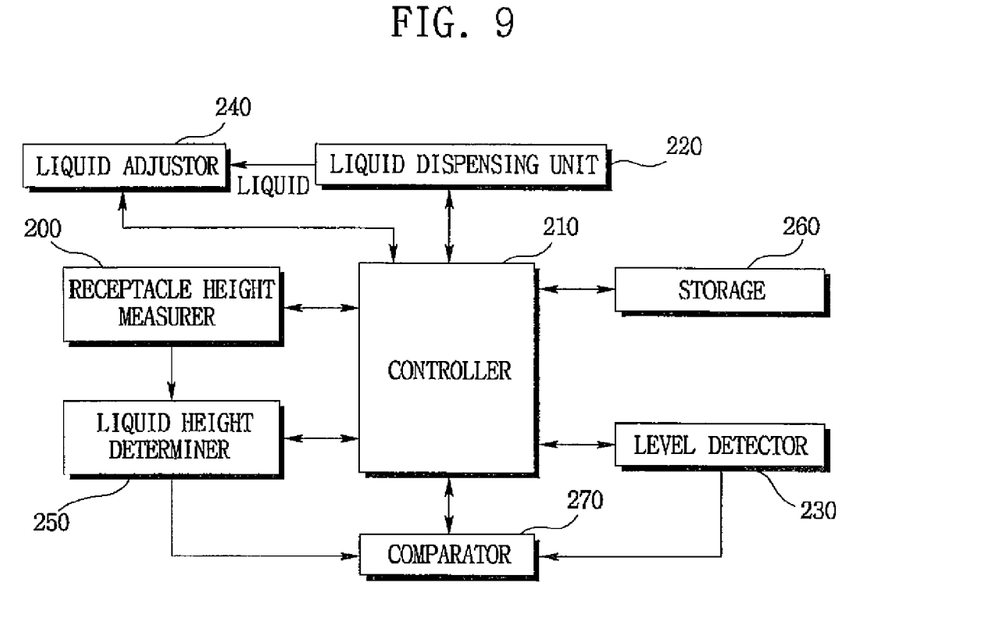
FIG. 9 is a schematic block diagram illustrating an automatic liquid dispenser according to a second exemplary implementation.

FIG. 9 is a schematic block diagram illustrating an automatic liquid dispenser according to a second exemplary implementation.

Referring to FIG. 9, the automatic liquid dispenser includes a receptacle height measurer 200 generating ultrasonic onto an upper surface of a receptacle and receiving the ultrasonic reflected from the upper surface of the receptacle to measure a receptacle height plural times, a receptacle height determiner 250 calculating an average value of the receptacle height measured plural times by the receptacle height measurer 200 to determine the receptacle height, a liquid dispensing unit 220 ejecting liquid into the receptacle, a storage 260 in which a liquid level relative to the receptacle height is stored as a predetermined data, a liquid level detector 230 detecting the level of the liquid inside the receptacle, a comparator 270 receiving the receptacle height determined by the receptacle height determiner 250 and the level of the liquid detected by the level detector 230 to compare the liquid level with the predetermined receptacle height stored in the storage 260, and a liquid adjusting unit 240 adjusting the liquid ejected from the liquid dispensing unit 220.

At this time, the receptacle height measurer 200, the receptacle height determiner 250, the liquid dispensing unit 220, the storage 260, the liquid level detector 230, the comparator 270 and the liquid adjusting unit 240 are controlled a controller 210.

Preferably, the receptacle height measurer 200 is disposed with at least one or more ultrasonic emission transducers and a plurality of ultrasonic reception transducers. Preferably, the receptacle height measurer 200 is operated in such a fashion that the ultrasonic emission transducer emits ultrasonic to an upper surface of the receptacle, and the receptacle height is measured plural times by an ultrasonic reception transducer which first and foremost receives the ultrasonic reflected from the upper surface of the receptacle, out of the plurality of ultrasonic reception transducers.

Preferably, the level detector 230 is an ultrasonic reception transducer which is most adjacent to the liquid dispensing unit 220 and the ultrasonic emission transducer, out of the plurality of ultrasonic reception transducers at the receptacle height measurer 200.

When a user places a receptacle into the automatic liquid dispenser thus constructed according to the present disclosure, the controller 210 outputs a control signal to the receptacle height measurer 200, instructing to the effect that an ultrasonic be emitted to all upper surface of the receptacle.

At this time, the automatic liquid dispenser may be designed to operate when a user places the receptacle and presses an operation key.

As a result, the ultrasonic emission transducer of the receptacle height measurer 200 emits the ultrasonic to an upper surface of the receptacle, and the ultrasonic reflected from the upper surface of the receptacle is received by the plurality of ultrasonic reception transducers.

Now, the receptacle height is measured plural times by an ultrasonic reception transducer which first receives the reflected ultrasonic, out of the plurality of ultrasonic reception transducers. The meaning of plural times of measurement is to measure the receptacle height as many as predetermined times (i.e. 5 times or 10 times) at a predetermined period corresponding to a frequency of an ultrasonic sensor. The plural times of measurement of the receptacle height starts when a user presses an operation button and ends just before the liquid is ejected, and the plural times of measurement of liquid level starts when the liquid is ejected and carries on until ejection of liquid ends.

Thereafter, an average value of the receptacle height plurally measured by the receptacle height measurer 200 is calculated to determine the receptacle height.

When the receptacle height is determined by the receptacle height determiner 250, the controller 210 outputs a control signal to the liquid dispensing unit 220 which in turn starts the ejection of the liquid into the receptacle.

Successively, when the liquid dispensing unit 220 starts to eject the liquid into the receptacle, the liquid level detector 230 detects the level of the liquid inside the receptacle.

Meanwhile, the storage 260 is stored with a predetermined data of the liquid level desired by a user relative to the receptacle height. For example, 80% of the receptacle height is set up as the liquid level, and data thus set up is stored in the storage.

The controller 210 outputs a control signal to the liquid adjuster 240 to adjust the ejection of liquid from the liquid dispensing unit 220, thereby preventing the liquid from splashing outside of the receptacle.

When the liquid level detected by the level detector 230 reaches a predetermined set-up liquid level relative to the receptacle height, the controller 210 preferably outputs a control signal to terminate the ejection of liquid from the liquid dispensing unit 220. Now, the comparator 270 receives the receptacle height and the liquid level determined by the receptacle height determiner 250 to compare the liquid level relative to the predetermined set-up receptacle height stored in the storage 260, and the controller 210 outputs a control signal to the liquid dispensing unit 220 to terminate the ejection of the liquid if the liquid level inside the receptacle is equal to or greater than the liquid level relative to the predetermined receptacle height.

Figure 10:
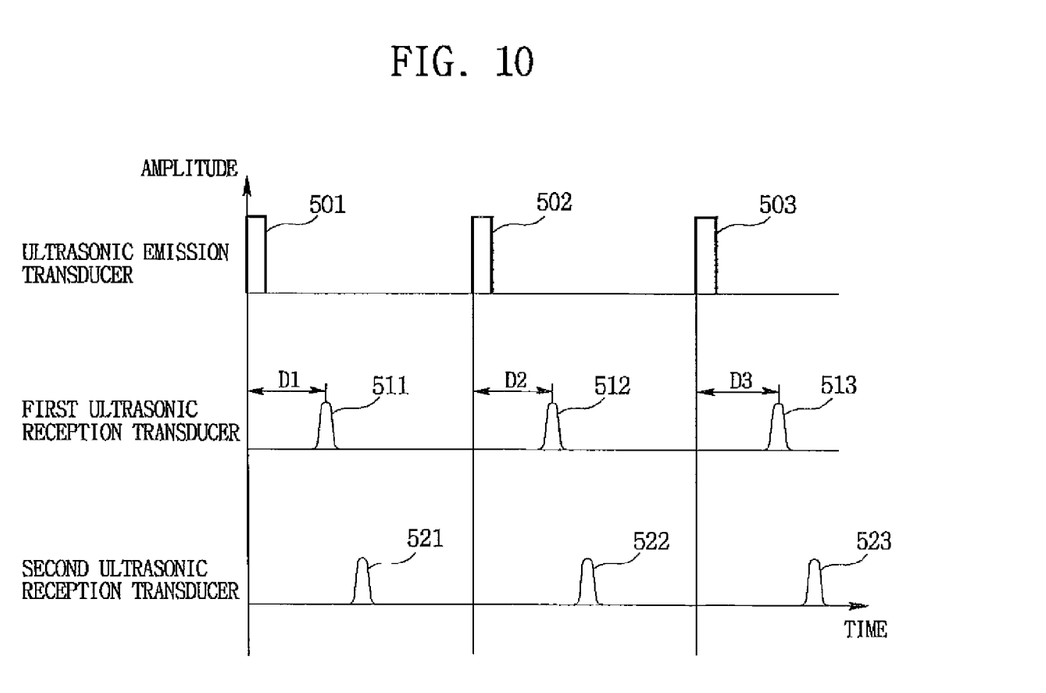
FIG. 10 is a characteristic graph explaining a concept for measuring a receptacle height by ultrasonic transducers.

FIG. 10 is a characteristic graph explaining a concept for measuring a receptacle height by ultrasonic transducers.

Referring to FIG. 10, when an ultrasonic emission transducer periodically emits ultrasonic signals 510, 502, 503, a first reception transducer receives periodic signals 511, 512, 513 reflected from the upper surface of the receptacle, and a second reception transducer also receives periodic signals 521, 522, 523.

The presently disclosed inventive technique is designed to measure a receptacle height by a reception transducer that has received ultrasonic signals, such that the signals 511, 512, 513 received by the first reception transducer measures the receptacle height in FIG. 10.

At this time, as a distance equals to ultrasonic speed×time/2, and distance is in proportion to time, receptacle heights in the characteristic graph of the first transducer are respectively D1, D2, D3. Therefore, an average obtained from D1, D2, D3 is calculated to determine the receptacle height.

Figure 11:
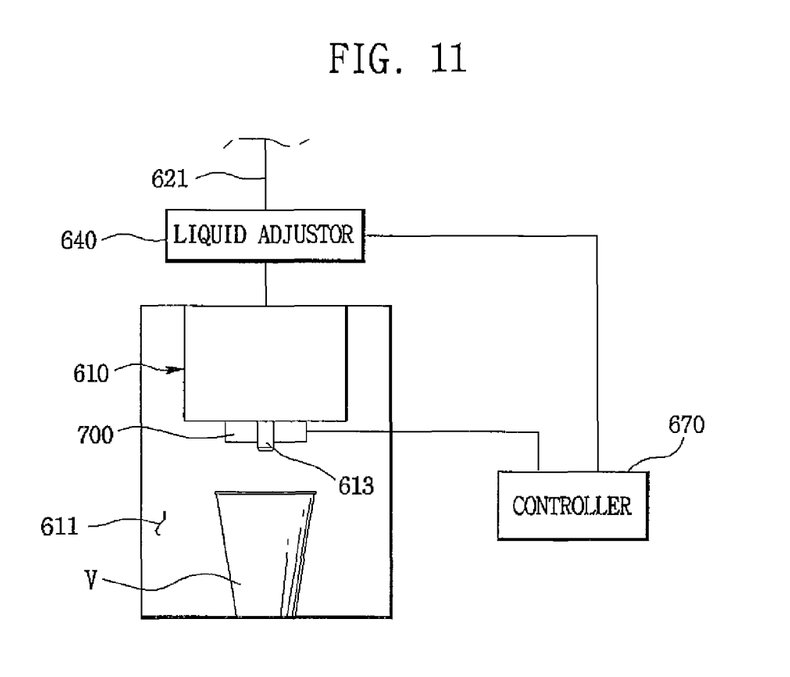
FIG. 11 is a schematic block diagram illustrating an automatic liquid dispenser according to a third exemplary implementation.
Figure 12:
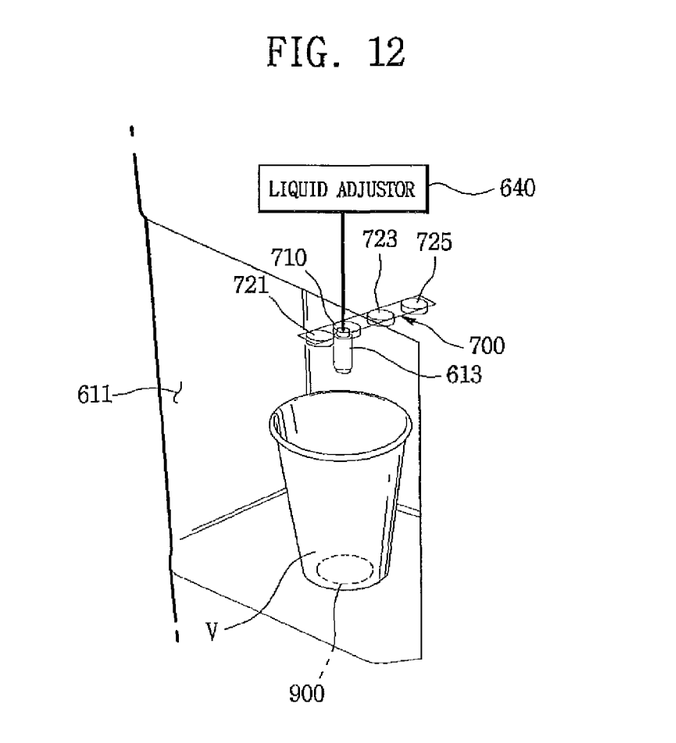
FIG. 12 is a perspective view of principal parts in FIG. 11.

FIG. 11 is a schematic block diagram illustrating an automatic liquid dispenser according to a third exemplary implementation, and FIG. 12 is a perspective view of principal parts in FIG. 11.

Referring to FIGS. 11 and 12, the automatic liquid dispenser includes a liquid supplier 610, a receptacle and level detector 700, a liquid adjuster 640 and a controller 670.

A receptacle accommodator 611 in which a receptacle (V) is accommodated is frontally opened at one side thereof and is formed with a predetermined size of a horizontally flat space on which the receptacle (V) may be accommodated inside the automatic liquid dispenser.

The receptacle accommodator 611 is disposed at an inner upper surface thereof with a liquid supplier 610. The liquid supplier 610 is connected to a liquid tank containing the liquid via a liquid path 619, and is equipped with one or more nozzles 613 of exhaust ports that are mounted above the receptacle accommodator 611.

In other words, liquid is supplied from the liquid tank to the liquid supplier 610 via the liquid path 619, and the liquid is ejected from the liquid supplier 610 through the nozzle 613.

Therefore, the automatic liquid dispenser according to the third exemplary implementation is disposed with a liquid adjustor 640 capable of adjusting one of the speed, quantity and speed or quantity of the liquid supplied from the liquid tank to the liquid supplier 610, and the liquid adjustor 640 is connected to the liquid path 621 interposed between the liquid tank and the liquid supplier 610.

The liquid adjustor 640 is preferably embodied by one of the afore-mentioned liquid quantity adjusting shutter, MFC (Mass Flow Controller), solenoid valves and n-way solenoid valve. In other words, the liquid adjustor 640 mounted on the liquid path may be embodied by a liquid quantity adjusting shutter which blocks a cross-section of the liquid path to adjust the liquid quantity.

The liquid adjustor 640 may be embodied by the MFC for adjusting the pressure of liquid supplied by the liquid supplier. The number of liquid path 621 interposed between the liquid tank and the liquid supplier may be plural, and solenoid valves respectively formed on the plurality of liquid paths may embody the liquid adjustor 640.

Besides, the liquid adjustor 640 may be also embodied by an n-way solenoid valve wherein one inlet and a plurality of outlets are disposed, an exhaust port is connected to the liquid path, and a plurality of outlets is disposed at the liquid supplier 610 to selectively block the plurality of outlets.

The receptacle and level detector 700 emits ultrasonic to the receptacle accommodated inside the receptacle accommodator 611 and detects the ultrasonic reflected from an upper surface of the receptacle or an upper surface of the liquid inside the receptacle to generate a signal.

The ultrasonic reflected from the upper surface of the receptacle can measure the receptacle height, and the ultrasonic reflected from the upper surface of the liquid inside the receptacle can measure the liquid level.

The controller 670 receives from the receptacle and level detector the signal relative to the liquid level inside the receptacle in real time to control the liquid adjustor 610, whereby the speed and quantity of liquid ejected from the nozzle can be controlled.

If it is determined that the level value of liquid inside the receptacle obtained in response to the signal inputted from the receptacle and level detector 700 is equal to or greater than the set-up value of the user, the controller 670 controls the liquid adjustor 640 to block the liquid path 621 and a supply process may be terminated if the user removes the receptacle to which the liquid supply has ended.

Figure 13:
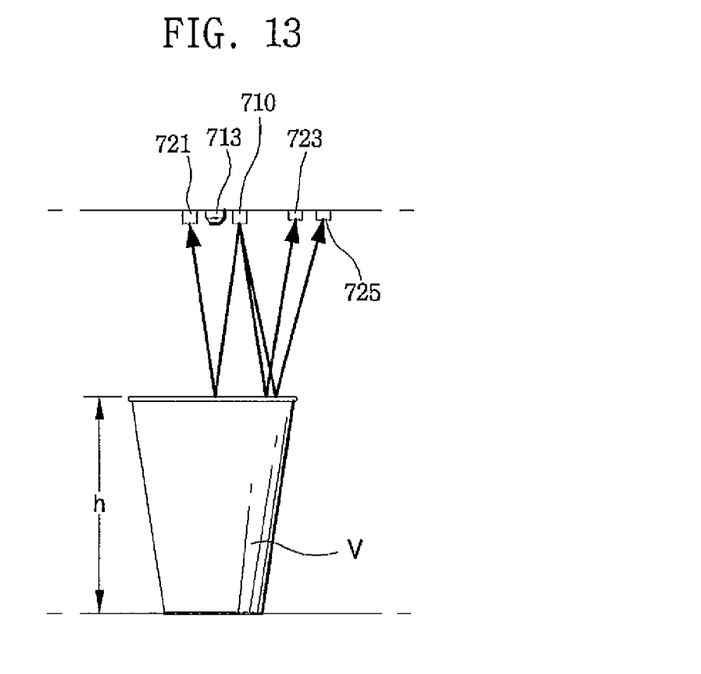
FIG. 13 is a conceptual drawing explaining a receptacle height detecting process by a receptacle and level detector according to the third exemplary implementation.
Figure 14:
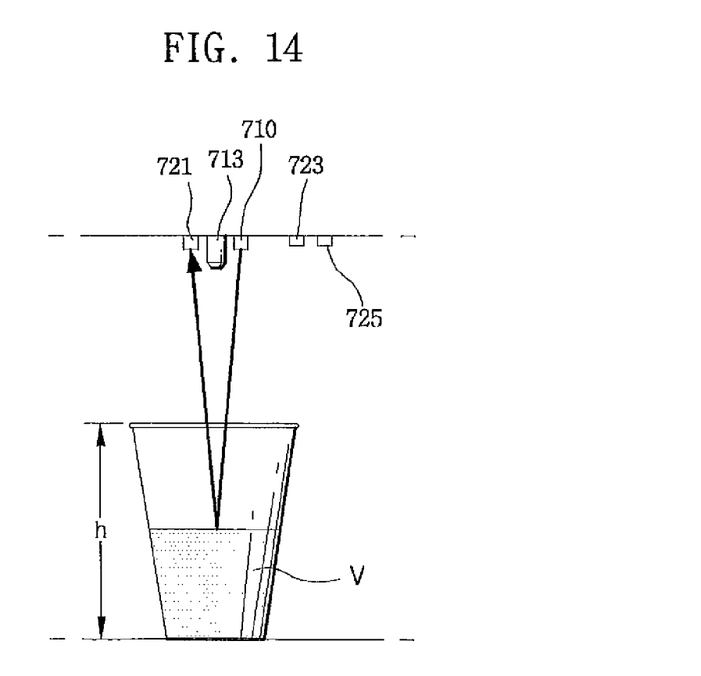
FIG. 14 is a conceptual drawing explaining a detecting process of level of liquid in a receptacle by a receptacle and level detector according to the third exemplary implementation.

FIG. 13 is a conceptual drawing explaining a receptacle height detecting process by a receptacle and level detector according to the third exemplary implementation, and FIG. 14 is a conceptual drawing explaining a detecting process of level of liquid in a receptacle by a receptacle and level detector according to the third exemplary implementation.

First, the receptacle and level detector includes an ultrasonic emission transducer 710 and one or more ultrasonic reception transducers 721, 723, 725. A nozzle 713 is interposed between the ultrasonic emission transducer 710 and an ultrasonic reception transducer nearest to the ultrasonic emission transducer 710.

Now, a method for measuring a receptacle height using the receptacle and level detector will be described in conjunction with FIG. 13.

When a receptacle (V) is positioned underneath the nozzle 713 disposed about the ultrasonic emission transducer and the plurality of ultrasonic reception transducers, the ultrasonic emission transducer 710 emits ultrasonic to an upper surface of the receptacle (V).

Next, the receptacle height is measured plural times by an ultrasonic reception transducer 721 which first and foremost receives the ultrasonic reflected from the upper surface of the receptacle (V), out of the plurality of ultrasonic reception transducers 721, 722, 723, and an average value obtained from the plurally measured receptacle height is calculated to determine the receptacle height.

The ultrasonic reception transducer that first receives the ultrasonic reflected from the upper surface of the receptacle (V) may vary according to the position, width and height of the receptacle (V).

Now, a method for measuring a level of liquid inside the receptacle using the receptacle and level detector will be described in conjunction with FIG. 14.

First, after the height of the receptacle (V) is determined, the liquid is ejected into the receptacle (V) from the nozzle 700 to a predetermined set-up level. At this time, the level is measured by an ultrasonic reception transducer nearest to the nozzle 700, and if the liquid reaches the predetermined set-up level, the nozzle 700 stops to eject the liquid. The level of the liquid inside the receptacle (V) is detected by the receptacle and level detector in real time.

Figure 15:
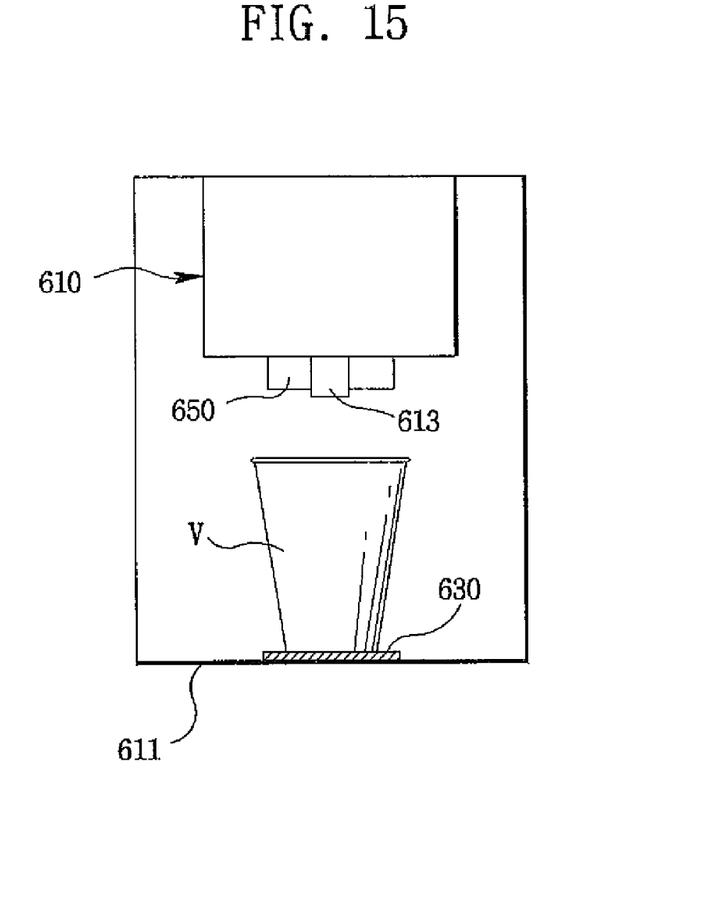
FIG. 15 is a schematic cross-sectional view illustrating a state of a receptacle arranger disposed in an automatic liquid dispenser.

FIG. 15 is a schematic cross-sectional view illustrating a state of a receptacle arranger disposed in an automatic liquid dispenser, and it is preferred that a receptacle arranger 630 be mounted at the receptacle accommodator 611 in order to smoothly arrange the receptacle (V). At this time, the receptacle arranger 630 is formed on a floor surface of the receptacle accommodator 611 as shown in FIG. 15.

In other words, if the receptacle arrange 630 is mounted at the receptacle accommodator 611 of an automatic liquid dispenser, a user can place the receptacle inside the receptacle accommodator 611, whereby the receptacle may be precisely placed underneath the nozzle 613 and the liquid ejected from the nozzle 613 may be inputted into the receptacle arranged on the receptacle accommodator 611, thereby enabling to prevent the liquid from splashing outside of the automatic liquid dispenser.

Figure 16:
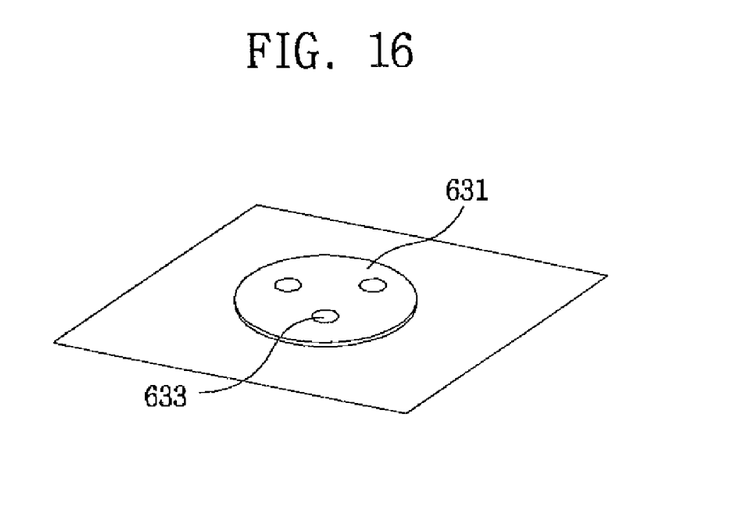
FIG. 16 is a schematic drawing illustrating a receptacle arranger according to an exemplary implementation.

FIG. 16 is a schematic drawing illustrating a receptacle arranger disposed in an automatic liquid dispenser, and it is preferred that the receptacle arranger be comprised of an identifying mark 631. In other words, the identifying mark 631 is designed for a user to easily accommodate the receptacle (V) on a precise position with the naked eye.

Preferably, the identifying mark 631 is made of a tape with a colored or hologram surface, or made of a colored material that may be distinguished from the floor surface of the receptacle accommodator 611. More preferably, the identifying mark 631 has an excellent reflectivity power relative to emission of ultrasonic from the receptacle and level detector 650.

The identifying mark 631, being formed in a circular shape on which the receptacle (V) is provided, is preferably made of water-proof material for easily removing the liquid because the identifying mark 631 is disposed inside the receptacle accommodator 611 of the liquid supplier 610 which might leak the liquid.

Preferably, the receptacle arranger 630 is further disposed with at least one or more optical sources 633 for the identifying mark, so that the user may easily accommodate the receptacle (V) inside the receptacle accommodator 611. In other words, the optical source 633 may be turned on or off responsive to a control signal from a controller to allow the user to precisely arrange the receptacle in the receptacle arranger 630.

The optical source 633 is preferably an LED (Light Emitting Diode) lamp. It should be understood however that a variety of other optical sources may be employed as long as identification by a user can be made easy, and installation position of the optical source is also an elective matter which is not to be restricted at all.

It should be understood that the above-described implementations are not limited by any of the details of the foregoing description. Accordingly, other implementations are within the scope of the following claims, and all changes that fall within meets and bounds of the claims, or equivalence of such meets and bounds are therefore intended to be embraced by the claims.

As apparent from the foregoing, the above-disclosed technique has an advantage in that a liquid adjustor is disposed to prevent the liquid from splashing outside of the receptacle, thereby saving the automatic liquid dispenser from being polluted with splashed liquid.

Another advantage is that ultrasonic is sent to all upper surface of a receptacle, and the ultrasonic reflected from the upper surface of the receptacle is received to detect a receptacle height, whereby the receptacle height may be freely detected regardless of shape, material and surface state, and position of the receptacle.

Another advantage is that ultrasonic is used to reduce a manufacturing cost of an automatic liquid dispenser compared with that of using light.

Still another advantage is that a receptacle arranger capable of precisely arranging a receptacle under a nozzle in a receptacle accommodator is employed such that liquid ejected from the nozzle may be inputted only into the receptacle placed on the receptacle accommodator to thereby prevent the liquid from splashing.

What is claimed is:

1. An automatic liquid dispenser comprising:
    a receptacle accommodator in which a receptacle is accommodated;
    a liquid supplier disposed discretely from a floor surface of the receptacle accommodator, and disposed with at least one or more nozzles and connected to a liquid tank filled with liquid via a liquid path;
    a liquid adjusting unit adjusting a speed of liquid, an amount of liquid, or a speed of liquid and an amount of liquid supplied to the liquid supplier from the liquid tank altogether;
    a receptacle and level detector emitting ultrasound to the receptacle and detecting the ultrasound reflected from the receptacle to generate a signal;
    a controller receiving the signal from the receptacle and level detector to control the liquid adjusting unit; and
    an identifying mark formed at the floor surface of the receptacle accommodator and below the liquid supplier to arrange the receptacle at an upper surface of the identifying mark.

2. The automatic liquid dispenser as claimed in claim 1, wherein the liquid adjusting unit includes a liquid quantity adjusting shutter for adjusting the amount of liquid being ejected by selectively blocking a cross-section of the liquid path.

3. The automatic liquid dispenser as claimed in claim 1, wherein the liquid adjusting unit includes an MFC (Mass Flow Controller) for adjusting a pressure of the liquid to be ejected to the receptacle.

4. The automatic liquid dispenser as claimed in claim 1, wherein the number of liquid paths interposed between the liquid tank and the liquid supplier is plural, and the liquid adjusting unit includes solenoid valves respectively disposed at each liquid path.

5. The automatic liquid dispenser as claimed 1, wherein the liquid adjusting unit includes an n-way solenoid valve wherein one inlet and a plurality of outlets are disposed, the inlet is connected to the liquid path, and the plurality of outlets are mounted at the liquid supplier to selectively block the plurality of outlets.

6. The automatic liquid dispenser as claimed in claim 1, wherein the identifying mark is made of water-proof material.

7. The automatic liquid dispenser as claimed in claim 1, wherein the identifying mark is disposed with at least one or more optical sources.

8. The automatic liquid dispenser as claimed in claim 1, wherein the receptacle and level detector includes a light sensor or an ultrasonic sensor.

9. The automatic liquid dispenser as claimed in claim 1, wherein the receptacle and level detector comprises:
    an ultrasonic emission transducer; and
    at least one or more ultrasonic reception transducers.

10. The automatic dispenser as claimed in claim 1, wherein the identifying mark has a high reflectivity surface.

11. The automatic dispenser as claimed in claim 1, wherein the identifying mark is disposed on a surface of the receptacle accommodator opposite the liquid supplier.

12. The automatic dispenser as claimed in claim 11, wherein the identifying mark has a high reflectivity surface.

* * * * *